(12) United States Patent
Boucadair et al.

(10) Patent No.: US 10,182,131 B2
(45) Date of Patent: Jan. 15, 2019

(54) METHOD FOR SELECTING NETWORK CONNECTION CONCENTRATORS

(71) Applicant: Orange, Paris (FR)

(72) Inventors: Mohamed Boucadair, Betton (FR); Christian Jacquenet, Pont-pean (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/550,964

(22) PCT Filed: Feb. 1, 2016

(86) PCT No.: PCT/FR2016/050208
§ 371 (c)(1),
(2) Date: Aug. 14, 2017

(87) PCT Pub. No.: WO2016/128644
PCT Pub. Date: Aug. 18, 2016

(65) Prior Publication Data
US 2018/0027097 A1    Jan. 25, 2018

(30) Foreign Application Priority Data
Feb. 13, 2015 (FR) ..................................... 15 51228

(51) Int. Cl.
*H04L 29/06* (2006.01)
*H04L 12/721* (2013.01)
(Continued)

(52) U.S. Cl.
CPC .......... *H04L 69/14* (2013.01); *H04L 12/5691* (2013.01); *H04L 45/124* (2013.01);
(Continued)

(58) Field of Classification Search
CPC ............... H04L 12/5691; H04L 45/124; H04L 45/245; H04L 69/14; H04L 69/16; Y02D 50/30
See application file for complete search history.

(56) References Cited

U.S. PATENT DOCUMENTS

| 7,657,618 B1 * | 2/2010 | Rothstein ................ H04L 69/16 709/223 |
| 2002/0059451 A1 * | 5/2002 | Haviv ..................... H04L 45/00 709/238 |

FOREIGN PATENT DOCUMENTS

| EP | 2903226 A1 | 8/2015 |
| WO | 2012142437 A1 | 10/2012 |
| WO | 2013170839 A1 | 11/2013 |

OTHER PUBLICATIONS

English translation of the Written Opinion of the International Searching Authority dated Jun. 29, 2017, for corresponding International Application No. PCT/FR2016/050208, filed Feb. 1, 2016.

(Continued)

*Primary Examiner* — Mewale A Ambaye
(74) *Attorney, Agent, or Firm* — David D. Brush; Westman, Champlin & Koehler, P.A.

(57) ABSTRACT

A selection method for selecting network connection concentrators for a given set of M≥1 communication paths usable by a communicating device. Each respective interface of the communicating device is connected to a respective path. The method includes the following acts: a) identifying a set $(P_1, P_2, \ldots, P_N)$ of N≥2 concentrators situated in at least one network to which the communicating device is connected, each concentrator making it possible to aggregate connections using a plurality of paths suitable for being used by the communicating device; b) obtaining the value of at least one quality of service parameter QoS(i,j) for at least one path i, where i=1, ..., M, and for concentrators $P_j$ reachable from the communicating device via the path i; and c) selecting at least one concentrator from the set on the basis of the quality of service values that are obtained. The method is applicable to the multipath TCP (MPTCP) protocol.

10 Claims, 4 Drawing Sheets

(51) Int. Cl.
 *H04L 12/709* (2013.01)
 *H04L 12/54* (2013.01)
(52) U.S. Cl.
 CPC ............ *H04L 45/245* (2013.01); *H04L 69/16* (2013.01); *Y02D 50/30* (2018.01)

(56) References Cited

OTHER PUBLICATIONS

International Search Report dated May 9, 2016 for corresponding International Application No. PCT/FR2016/050208, filed Feb. 1, 2016.
Written Opinion of the International Searching Authority dated May 9, 2016 for corresponding International Application PCT/FR2016/050208, filed Feb. 1, 2016.
Information Sciences Institute University of Southern California, "Transmission Control Protocol Darpa Internet Program Protocol Specification", Sep. 1981, RFC 793.
Scharf et al., "Multipath TCP (MPTCP) Application Interface Considerations" Internet Engineering Task Force (IETF), RFC 6897, Mar. 2013.
Ford et al., "TCP Extensions for Multipath Operation with Multiple Addresses; rfc6824.txt", TCP Extensions for Multipath Operation With Multiple Addresses; RFC6824.TXT, Internet Engineering Task Force. IETF; Standard, Internet Society (ISOC) 4, Rue Des Falaises CH-1205 Geneva, Switzerland, Jan. 17, 2013 (Jan. 17, 2013), pp. 1-64, XP015086539.

* cited by examiner

METHOD FOR SELECTING NETWORK CONNECTION CONCENTRATORS

CROSS-REFERENCE TO RELATED APPLICATIONS

This Application is a Section 371 National Stage Application of International Application No. PCT/FR2016/050208, filed Feb. 1, 2016, the content of which is incorporated herein by reference in its entirety, and published as WO 2016/128644 on Aug. 18, 2016, not in English.

FIELD OF THE DISCLOSURE

The present invention relates to the field of telecommunications, and in particular to communications networks suitable for implementing the Internet protocol (IP). More particularly, the present invention relates to providing "added-value" services in IP networks, i.e. networks capable of performing processing that differs depending on the nature of the data traffic being conveyed in the network.

The invention applies to any type of client device, such as a fixed or mobile terminal, or a residential gateway, or a business gateway, or indeed a network operator gateway. For reasons of concision, a client device of any type is often referred to below as a "terminal".

BACKGROUND OF THE DISCLOSURE

Terminals, such as smartphones or personal computers (PCs) are nowadays capable of activating and using a plurality of logic interfaces associated with one or more physical interfaces. Such terminals are said to be multi-interface (MIF) terminals.

A plurality of IP addresses can be allocated to such MIF terminals so that they can connect to different types of network such as a fixed network, a mobile network, or a wireless local area network (WLAN), where the emblematic example would be a WiFi network, and in a manner that may be simultaneous or deferred. These IP addresses may:
  belong to the same family of addresses or to different families of addresses (IPv4, IPv6, or both);
  have different lifetimes;
  have different scopes, e.g. a private IPv4 address, a unique IPv6 address of local scope (i.e. a unique local address (ULA)), or an IPv6 address of global scope (global unicast address (GUA)); and
  be allocated to the same logical network interface or to different logical network interfaces.

Nevertheless, it should be observed that the "MIF" characteristic is volatile, since the ability to use a plurality of interfaces depends on conditions of connection to the network(s), on the location of the device, or on other factors. An MIF device may in particular make use of a plurality of interfaces that are available to it while setting up a simple connection (i.e. a connection set up along a single path with a given third party), or after setting up a simple connection. It may also be observed that a device does not know a priori whether it has the possibility of using a plurality of distinct paths for setting up a communication with a given third party. More precisely, the device acquires this information (where appropriate) only at the end of a stage during which it attempts to set up a multipath connection with the third party.

When a terminal has a plurality of interfaces capable of connecting to different types of access network (e.g.: fixed, mobile, or WLAN), it then benefits from access that it said to be "hybrid", since it combines different access network technologies. The services on offer concerning a terminal having hybrid access rely on introducing functions in the network that make it possible to aggregate all of the network connections of a terminal (e.g.: WLAN and 3G, or ADSL, WLAN and 4G).

In this respect (cf. Wikipedia) it should be recalled that in the field of networks, the term "aggregating links" designates grouping together a plurality of network interfaces as though they constituted a single interface, in particular for the purpose of increasing throughput beyond the limits of a single link, and optionally for ensuring that other interfaces take over in the event of a network link failing (redundancy principle). Link aggregation applies to any type of traffic conveyed along such links, including IP traffic.

Link aggregation may also be used to share traffic over a plurality of links. Under such circumstances, the way traffic is shared among the links/interfaces making up an aggregate of links depends on various parameters; for example, it depends on the type of traffic (such as TCP or UDP), or on the traffic engineering policy (such as the required quality of service (QoS)).

It should be observed that link aggregation makes no assumption concerning the configuration of the remote machine. Thus, a source machine may activate a link aggregation procedure without the remote machine using such a function.

Various modes of aggregation may be envisaged, including the following three modes:
  backup mode: this mode consists in using secondary paths in the event of primary paths being unavailable, with this being for the purpose of improving the availability of the network and thus the robustness and the reliability of IP connections set up over the various links;
  bonding mode: this mode consists in using the resources associated with some or all of the available paths, the IP streams associated with a given application possibly being shared among a plurality of paths; the decision to use all of the paths, or only some of them, may for example be conditioned by the nature of the traffic or the availability or reliability characteristics associated with each path, which characteristics may vary greatly from one path to another; all of the paths selected for this bonding mode are considered as being primary paths; and
  a "comfort" mode: this mode is similar to the bonding mode, except that the streams of a given application are not shared among a plurality of paths, but are sent over a single path.

It should be observed that these modes are not mutually exclusive, and that they are not specific to any one particular type of traffic. Thus, they may be put into place independently of the nature of the traffic that is to be conveyed along paths aggregated in one or another of the various modes.

The term "network connection concentrator" is used to designate any network function making it possible to aggregate the connections making use of the various paths that can be used by a device in order to set up communication with a remote device. The use of a network connection concentrator has in particular the effect whereby a connection that is seen by a local device as being a multipath connection may be seen by a remote device as being a simple connection.

By way of example, a network connection concentrator may be a function incorporated in a residential or business gateway, or it may cohabit with a multipath TCP (MPTCP) or a stream control transmission protocol (SCTP) proxy function or with a generic routing encapsulation (GRE) tunnel termination point, or indeed with a termination point of IP-in-IP tunnels or of level 2 tunnels. Where appropriate, the aggregation of all of the multiple paths by a network connection concentrator may lead to one or more virtual tunnels being set up, e.g. in order to facilitate management operations associated with setting up the communication (by isolating the traffic characteristic of the communication set up over the various paths as aggregated in this way, and improving the process for detecting failures).

FIGS. 1a, 1b, and 1c show various types of architecture associated with network connection concentrators.

These figures show a terminal T connected to one or more IP networks. The natures of these various access networks may be wired, wireless, or other; furthermore, these accesses may be multiple, i.e. the terminal T may have the ability to connect to different access networks simultaneously, or otherwise.

The terminal T is connected to the IP networks via N nodes ($P_1, P_2, \ldots, P_N$) having a network connection concentrator function. By way of example, such a node may be a gateway (residential or business) or an IP router. In the figures, it can be seen that:

the terminal may be connected to a single network managed by a single IP connectivity provider who has deployed at least one network connection concentrator (FIG. 1a); or the terminal may be connected to m networks R1, ..., Rm all of which host at least one network connection concentrator (FIG. 1b); or indeed the terminal may be connected to m networks R1, ..., Rm, some of which host a plurality of network connection concentrators (FIG. 1c).

Nevertheless, using multiple paths for setting up communications raises problems of various kinds.

It is commonly accepted that the use of load sharing mechanisms between a plurality of paths needs to ensure that those paths possess a comparable level of quality of transfer, in particular so as to avoid weakening the integrity of the data that is characteristic of a given connection and that is exchanged over those various paths (the quality of transfer may be characterized by a plurality of parameters including, in particular: latency, jitter, and rate of packet loss).

When a terminal benefits from hybrid access, its actual ability to make use of all of its interfaces is generally associated with the quality of each of the access networks in question, as perceived by the terminal. This quality may be expressed in terms of available bandwidth, of time to access the desired content, or indeed in terms of variation in the delay for transmitting two consecutive packets. This quality naturally varies from one access network to another, and may present differences that can be so great as to compromise setting up a multipath communication over the various access networks; the risk of a loss of integrity of the streams exchanged during the communication increases with any increase in such differences, to such an extent that the communication might become unintelligible. The aggregated link will present quality that depends in particular on the location of the network connection concentrator.

These different quality levels can compromise setting up additional subflows in the context of a multipath connection. The above-mentioned magnitude of the risk of integrity loss might incite the terminal to set up a simple connection only, even though that means losing the benefits characteristic of a multipath connection, such as optimizing available resources in terms of bandwidth.

Such a risk is also made worse in the context of a terminal that does not have its own means enabling it to set up a multipath connection, and doing this by calling on a network connection concentrator deployed in the access network to which the terminal is connected. In this context, the question of different levels of quality associated with using the plurality of available concentrators (e.g. depending on the location of the remote terminal with which the terminal seeks to set up a communication) becomes correspondingly more complex to solve when the terminal does not necessarily have the information and the intelligence required for selecting the concentrator that presents the best guarantees of quality, e.g. depending on the nature of the traffic, of the application, or of the service associated with the communication.

SUMMARY

In a first aspect, the present invention thus provides a selection method for selecting network connection concentrators for a given set of M≥1 communication paths usable by a communicating device, each respective interface of said communicating device being connected to a respective path, said method comprising the following steps:

a) identifying a set ($P_1, P_2, \ldots, P_N$) of N≥2 concentrators situated in at least one network to which the communicating device is connected, each concentrator making it possible to aggregate connections using a plurality of paths suitable for being used by the communicating device;

b) obtaining the value of at least one quality of service parameter QoS(i,j) for at least one path i, where i=1, ..., M, and for concentrators $P_j$ reachable from the communicating device via said path i; and c) selecting at least one concentrator from said set on the basis of said quality of service values that are obtained.

It should be observed that the invention may be implemented by any IP device. The device may be of any kind, e.g. a terminal, a router, a residential gateway, and it may be an MIF device or a single-interface device. The device may have one or more IP addresses allocated to each of its physical or logical interfaces. It could equally well have only one interface if it is situated behind a proxy device (such as a router or a residential gateway) that is itself connected to one or more networks and compatible with a link aggregation mechanism.

It should also be observed that the selection method of the invention applies to all kinds of IP traffic. In particular, the method may advantageously be implemented to prepare for exchanging data transported using any of the following protocols: TCP, UDP, SCTP, IP-in-IP, TCP-over-UDP, or TCP-over-TCP. By way of example, setting up GRE or IP-in-IP tunnels makes it possible to aggregate some or all of the IP traffic (including in particular TCP and UDP traffic) between a terminal and one or more concentrators.

The invention offers in particular the following advantages:

deterministic selection of the network connection concentrator(s);

the possibility of adapting to network connection conditions (e.g. as a function of available access throughputs);

means for avoiding degradation to the quality of a connection (which degradation may be caused by the multiple paths involved in the streams associated with a single connection having very different quality levels);

an increase in the capacity of the network used by a terminal;

benefiting from the advantages of link aggregation mechanisms, but without that requiring any intelligence on the part of remote servers; and proactive detection of network anomalies, enabling suitable decisions to be taken for redirecting traffic, should that be necessary, towards another network connection concentrator.

Furthermore, the quality of service evaluation in accordance with the invention may be used by the communicating device to identify which paths are suitable for being aggregated in such a manner as to preserve a uniform level of quality of service when the resources associated with those paths are involved. In particular, a communicating device may maintain a plurality of aggregates, each respective aggregate presenting a respective quality of service level. It is clear that setting up aggregates that are uniform (i.e. in which the elements all present comparable quality of service levels) depends on the selected concentrator(s). A communicating device may proceed with setting up uniform aggregates before or after selecting concentrators in accordance with the invention. If the communicating device begins by setting up uniform aggregates, it should then preferably perform this operation for all of the concentrators.

In particular, paths presenting mediocre quality of service may be involved in conveying application streams that are not the subject of quality of service constraints; nevertheless the use of such paths is generally justified only if the applications in question are suitable for specifying their needs in terms of quality of service.

A path may be excluded from an aggregate or that path may be included in an aggregate in a manner that varies over time as a function of network conditions. The communicating device may take other criteria into account, such as the nature of the traffic that is likely to be conveyed over the paths of an aggregate, in order to include or exclude a path in or from an aggregate. It should be observed that excluding a path from an aggregate does not mean that that path is necessarily deactivated by the terminal.

Furthermore, with a communicating device that is compatible with connections in compliance with the (above-mentioned) MPTCP protocol set up over multiple paths, the invention makes it possible to improve significantly the engineering and the operation of such connections (as described below) by improving the quality and the robustness of the process for managing subflows that is characteristic of the MPTCP protocol. For example, putting tunnels into place as mentioned above may advantageously be combined with MPTCP functions for engineering reasons, such as off-loading MPTCP proxies if the remote server is compatible with the MPTCP protocol; a network operator can thus optimize the network resources that are dedicated to a proxy function.

According to particular characteristics, during said step c), the selected concentrator $P_{k(i)}$ is the concentrator for which the quality of service value QoS(i,k(i)) is optimal in comparison with the quality of service values QoS(i,j), where j≠k, of the other concentrators that have been reached from the communicating device via the path i.

By means of these provisions, the resulting quality of service is optimal for each path of said set of M communication paths.

According to other particular characteristics, during step c), a single concentrator $P_k$ is selected for all of said M paths, this concentrator $P_k$ being the concentrator for which the quality of service value QoS(i,k) is optimal in comparison with the quality of service value QoS(i,j), where j≠k, of the other concentrators that have been reached from the communicating device, and for the largest number of paths among the M paths.

By means of these provisions, the source address of the messages issued by the communicating device via any of the M paths is preserved in a manner that is simple.

It should be observed that both of the embodiments described briefly above become trivially identical when the terminal has only one single communication path. Furthermore, those embodiments naturally give the same result when, regardless of the path, it is always the same concentrator that provides the optimal value for quality of service.

In a second aspect, the invention also provides various devices.

Thus, the invention firstly provides a communicating device having means for:

identifying a set $(P1, P2, \ldots, P_N)$ of N≥2 concentrators situated in at least one network to which the communicating device is connected, each concentrator making it possible to aggregate connections using a plurality of paths suitable for being used by the communicating device;

obtaining the value of at least one quality of service parameter QoS(i,j), for at least one path i, where i=1, M from a given set of M≥1 communication paths usable by said communicating device, and for concentrators $P_j$ reachable from the communicating device via said path i, each respective interface of the communicating device being connected to a respective path; and selecting at least one concentrator from said set on the basis of said quality of service values that are obtained.

Said communicating device may comprise a client device such as a user terminal, or it may comprise a proxy device such as a router or a residential gateway suitable for implementing a multipath connection and connected to a client device optionally suitable for implementing a multipath connection.

Secondly, the invention also provides a server for selecting network connection concentrators, the server having means for use for at least said path i, for assisting in redirecting traffic issued by or sent to a communicating device as described briefly above, towards said selected concentrator.

The advantages made available by these devices are essentially the same as those made available by the selection method set out briefly above.

It should be observed that it is possible to implement those various devices in the context of software instructions and/or in the context of electronic circuits.

In a third aspect, the invention provides a system for selecting network connection concentrators, the system comprising:

a communicating device having means for:

identifying a set $(P1, P2, \ldots, P_N)$ of N≥2 concentrators situated in at least one network to which the communicating device is connected, each concentrator making it possible to aggregate connections using a plurality of paths suitable for being used by the communicating device; and obtaining the value of at least one quality of service parameter QoS(i,j), for at least one path i, where i=1, M from a given set of M≥1 communication paths usable by said communicating device, and for concentrators $P_j$ reachable from the communicating device via said path i, each respective interface of the communicating device being connected to a respective path; and a server for selecting network connection concentrators and having means for:

selecting at least one concentrator from said set on the basis of said quality of service values that are obtained; and for at least the path i, assisting in redirecting the traffic issued by or sent to the communicating device towards said selected concentrator.

The invention also provides a computer program downloadable from a communications network and/or stored on a computer-readable medium and/or executable by a microprocessor. The computer program is remarkable in that it includes instructions for executing steps of the selection method set out briefly above, when executed on a computer.

The advantages made available by the system, and by the computer program, are essentially the same as those made available by the selection method set out briefly above.

BRIEF DESCRIPTION OF THE DRAWINGS

Other aspects and advantages of the invention appear on reading the following detailed description of particular embodiments given as non-limiting examples. The description refers to the accompanying figures, in which.

DETAILED DESCRIPTION OF ILLUSTRATIVE EMBODIMENTS

Figure 1A:
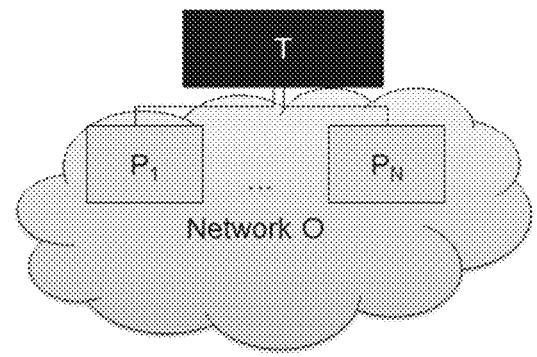
FIGS. 1a, 1b, and 1c, described above show various types of architecture associated with network connection concentrators.
Figure 1B:
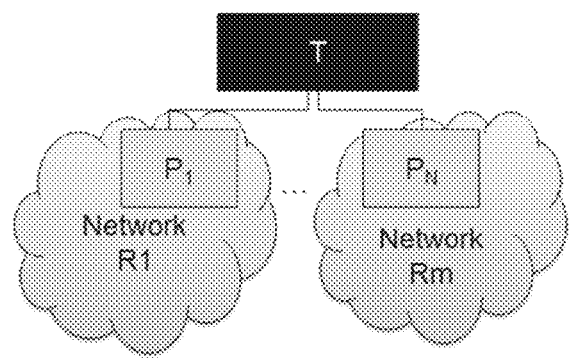
Figure 1C:
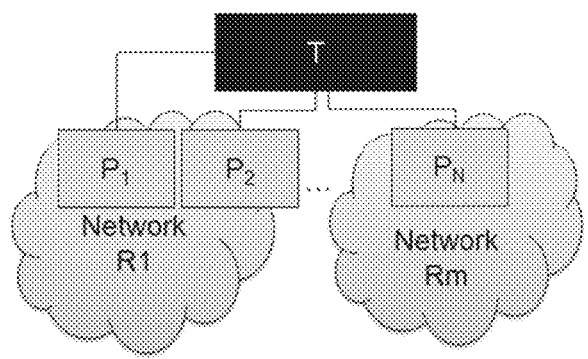

The invention relates to a given set of M≥1 communication paths usable by a communicating device, each respective interface of the communicating device being connected to a respective path. This set may comprise all of the paths known to the communicating device, or else only some of them.

The invention applies in general manner to any protocol governing multipath IP connections. There follows a description of the invention applied to the MPTCP protocol, after a few reminders about certain properties of this protocol.

Firstly, it should be recalled that the transmission control protocol (TCP) as defined in particular in specification RFC 793 of the Internet Engineering Task Force (IETF) is one of the main protocols used by terminals connected to an IP network (e.g. the Internet), such that the literature often refers to the "TCP/IP" suite of protocols. The TCP protocol serves to convey a stream of digital data in reliable, ordered, and error-free manner between applications executed on terminals connected to a local network (e.g. an Intranet) or to the Internet. The TCP protocol operates at the level of the transport layer of the OSI model. Web browsers use the TCP protocol when they connect to remote servers; the TCP protocol is also used for conveying email or for transferring files from one place to another. Protocols such as HTTP, HTTPS, SMTP, POP3, IMAP, SSH, FTP, Telnet, and various other protocols are transported over TCP connections. A TCP connection is identified by the address and the port number of the source terminal, and also by the address and the port number of the destination terminal.

Two terminals may insert so-called "TCP options" in the TCP messages exchanged between them, e.g. for the purpose of optimizing the quality of the TCP connection. Such options occupy the space available at the end of the TCP header, and are of a length that is expressed in octets (8-bit bytes). The kind of the option is a unique identifier describing the nature of the TCP option. For example, the value "0" indicates the end of the list of options, and the value "2" indicates the maximum size of the TCP segment (i.e. maximum segment size (MSS)).

The arrival of MIF terminals makes it possible to use the resources of a plurality of paths via the available networks in order to set up a TCP connection, making use of some or all of the IP addresses allocated to the various interfaces of MIF terminals. Nevertheless, this possibility introduces complexity that is characteristic of the mode of operation of the TCP protocol: given that any TCP connection is associated with an IP address and a port number, any change to at least one of those items of information is of a nature to penalize the operation of the current TCP connection, and thus the service making use of said TCP connection. Such a change is particularly prejudicial when the terminal is given a new IP address, or when the terminal connects to another network, or indeed when the interface with which the IP address is associated is no longer available. For example, means for informing a remote TCP third party that an IP address is no longer valid are then needed in order to ensure that an existing connection is maintained without interrupting the services made available by that TCP connection.

In 2009, the "mptcp" workgroup of the IETF was tasked with specifying extensions to the TCP protocol capable of accommodating the constraints imposed by the possibility of allocating a plurality of IP addresses to the various logical or physical interfaces of a terminal. That workgroup published initial specifications for the MPTCP protocol (cf. A. Ford, C. Raiciu, and M. Handley "TCP extensions for multipath operation with multiple addresses", RFC 6824, January 2013)—that certain smartphones and certain operating systems are already capable of implementing. The MPTCP protocol serves in particular to satisfy the need to ensure continuity for an IP session in the event of the terminal being mobile. The IETF envisages causing the status of present MPTCP specifications to advance so that they become genuine standards in the meaning of the IETF.

The MPTCP protocol has thus been proposed for minimizing any risks of untimely rupture of a TCP connection, e.g. associated with such changes of address, and more generally to satisfy the requirements raised by a context in which a terminal has the ability to connect to one or more networks via one or more interfaces.

Furthermore, in the event of a failure of an attempt to set up an MPTCP connection, Document RFC 6824 makes provision for the connection to switch automatically to a simple TCP connection.

Figure 2:
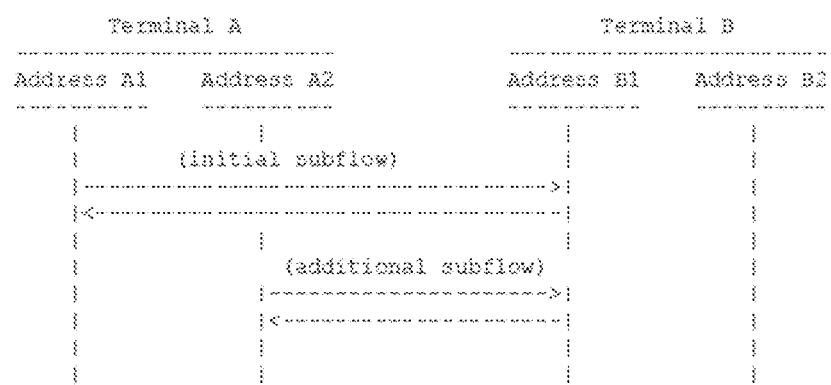
FIG. 2 shows an aggregate of TCP subflows forming a single MPTCP connection.

In the context of the MPTCP protocol, the term "subflow" is used to designate a TCP connection that relies on using one of the available (IP address, port number) pairs. As a result, an MPTCP connection is an aggregate of TCP subflows. By way of example, FIG. 2 shows an MPTCP connection between a terminal A and a terminal B; the initial subflow is set up between the address A1 of the terminal A and the address B1 of the terminal B; subsequently, an additional subflow is set up between the address A2 of the terminal A and the address B1 of the terminal B. An MIF terminal can thus be connected to new networks, or can detach itself from some networks, while maintaining a single multipath connection.

A particularly advantageous example of an application of the MPTCP protocol is transferring voluminous files while using the resources of the file transfer protocol (FTP). A device acting as an FTP client can make use dynamically of all of the available paths enabling it to access an FTP server, providing that FTP server is capable of using the various MPTCP connections set up by the FTP client. The time required to transfer data is thus significantly shortened compared with a TCP connection.

Various usages may be envisaged for the MPTCP protocol, such as:
  exchanging data between a plurality of wireless access networks;
  reducing the load on a mobile network by switching a fraction of the traffic to a wireless access network;
  optimizing the use of network resources by making simultaneous use of the resources of a plurality of access links and by sharing the traffic load from one or more MPTCP connections over those various links, thus making it possible significantly to increase the bandwidth associated with setting up an MPTCP connection; and
  making an MPTCP connection more reliable by switching the traffic conveyed over a primary path to a backup path in the event of a rupture in the primary path, and to do so in a manner that is transparent for the user (i.e. without interruption of service).

Operating systems make dedicated programming interfaces known as application programming interfaces (APIs) available to applications in order to interact with the TCP and IP layers. The conventional API made available to TCP/IP applications is the "socket" interface. The "socket" interface is characterized by several attributes, such as the "local socket address", the "remote socket address", and the "protocol". Extensions to the TCP/IP API, known as the MPTCP API have been specified by the IETF in Document RFC 6897 to enable applications to control MPTCP connections.

An MPTCP connection is initialized like any conventional TCP connection, except that a TCP option known as MP_CAPABLE (i.e. indicating that the sending terminal is compatible with the MPTCP extensions) is included in the message containing the connection initialization flag (SYN) and in subsequent messages. An MPTCP terminal can inform the remote terminal about the availability of an additional IP address by using a TCP option known as ADD_ADDR, without necessarily creating an associated subflow.

Indicating a plurality of IP addresses that are available and suitable for use in communication with a third party can lead to failure in setting up certain TCP subflows, because the external IP addresses as perceived by the remote terminals need not be the same as those that are visible locally. That is why the ADD_ADDR option of the MPTCP protocol includes an address identifier referred to as "address ID", that is used to identify without ambiguity an available IP address. This provision is intended to avoid the problems induced by the presence of an NAT on the path followed by the packets between the two terminals that have set up an MPTCP connection. The ADD_ADDR option is also used for transmitting a port number in the event that one of the MPTCP terminals does not use the same port number for all of the available IP addresses.

Likewise, the MPTCP protocol specifies provisions that are intended in particular to make it possible to pass through firewalls. More precisely, the specification of the MPTCP protocol stipulates that the sequence numbers as indicated in the TCP header are specific to each subflow, while the sequence number indicated in the data sequence signal (DSS) option of the MPTCP protocol serves to associate these subflows with the same MPTCP connection.

The MPTCP protocol thus seeks to escape from the constraints imposed by the massive proliferation in current networks of so-called "middle boxes" (i.e. intermediate functions in a communications chain), such as NATs and firewalls.

In particular, the MPTCP protocol makes use of the following TCP options:
  MP_CAPABLE: this option, mentioned above, is used to inform the remote terminal that the sending terminal is compatible with the MPTCP options;
  ADD_ADDR: this option, mentioned above, is used to add a new address; it includes an optional two-octet field for also providing a port number, where appropriate;
  REMOVE_ADDR: this option is used for removing an address;
  MP_PRIO: this option is used for modifying the priority of a connection;
  MP_JOIN: this option is used for identifying the TCP connection that is associated with setting up a new subflow;
  MP_FAIL: this option is used to return to TCP mode without MPTCP options; and
  MP_FASTCLOSE: this option is used to close an MPTCP connection quickly.

The MPTCP protocol may be activated in several modes:
  native mode: two MPTCP terminals set up all of the subflows that correspond to the available address and/or port numbers; and make use of all of the subflows;
  primary mode: two MPTCP terminals specify subflows, but only a subset of these subflows is in fact used for transferring data;
  secondary mode: in the event of non-availability (or overload) of the "primary" subset of subflows, a "secondary" subset of subflows is then requested in order to provide continuity of the MPTCP connection; and
  backup mode: two MPTCP terminals use a single subflow; in the event of failure, traffic is switched to a new subflow created for that purpose.

As mentioned above, the selection method of the invention may be implemented by various types of communicating device. The communicating device may for example be a client device, such as an IP terminal, or a gateway (such as a residential gateway or a business gateway) directly connected to the network. It should be observed that an MIF terminal located behind a gateway may make use of the method without needing any coordination with the gateway.

Figure 3:
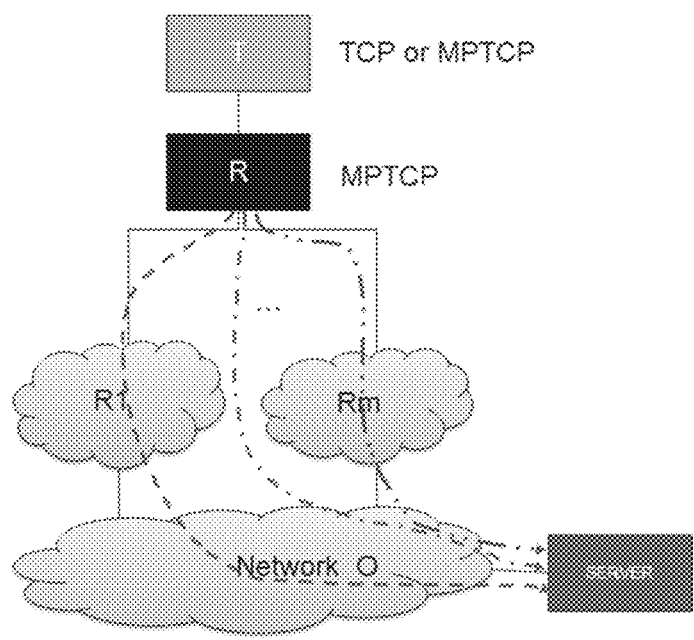
FIG. 3 shows a TCP or MPTCP terminal placed behind an MPTCP-compatible proxy device.

The method of the invention may also be performed by equipment referred to as a proxy device, located in the network and acting in the name of a client device such as a terminal or a gateway (such a proxy device is said to "simulate" or "emulate" its clients). It is thus on the basis of the results of the method of the invention that a client device connected to a proxy device is configured. This configuration enables the client device to benefit from the optimization of the use of available network resources (the characteristic of multipath connections), and also to set up multipath connections in a short length of time. By way of example, FIG. 3 shows a TCP or MPTCP terminal T placed behind a proxy device R that is MPTCP-compatible.

It should be observed that the communicating device of the invention may be configured to abstain from making use of resources for aggregating network links (and thus from performing any kind of concentrator selection) with certain networks, or under certain operating conditions (e.g. when network connection concentrators are overloaded).

There follows a description of an embodiment of the selection method of the invention.

In a first step, a terminal T that is compatible with multipath communications identifies a set $(P_1, P_2, \ldots, P_N)$ of $N \geq 1$ concentrators (e.g. a list of MPTCP relays) situated in at least one network to which the terminal T is connected. This determination may be the result of the terminal T being statically configured, or it may be the result of a dynamic identification or dynamic discovery procedure.

In this respect, it should be recalled that discovering the various paths connecting a given device to a given third party can be undertaken by way of example by using a protocol for dynamically allocating IP addresses such as the dynamic host configuration protocol (DHCP), or by a mechanism for creating a mapping such as the port control protocol (PCP), the universal plug and play (UPnP) mechanism, the Internet gateway device (IGD) mechanism, or the session traversal utilities for NAT (STUN) mechanism, where the term "mapping" is used to designate associating an internal IP address and an internal port number with an external IP address and an external port number).

The information characteristic of the identification of various connection concentrators may be presented to the terminal T in the form of a list of domain names ({name1, name2, . . . , nameN}), or in the form of a list of IP addresses ({IP@1, IP@2, . . . , IP@N}). Other means for identifying connection concentrators may be envisaged.

If at least one domain name (or identifier) is configured in the terminal T, mechanisms are invoked for resolving this identifier into one or more IP addresses. For example, the domain name service (DNS) may be queried to recover the corresponding IP address(es). These resolution mechanisms are implemented for each of the elements of the list of identifiers.

The terminal T thus recovers N IP addresses {IP@1, IP@2, . . . , IP@N} where $N \geq 1$. These addresses may be IPv4 or IPv6 addresses. Thus, the list may be constituted by IPv4 addresses only, or by IPv6 addresses only, or indeed by a mixture of both IPv4 and IPv6 addresses.

If the terminal T has recovered only one address (IP@1) at the end of step S1, it naturally selects the corresponding concentrator for all of the multipath connections.

In contrast, if at the end of the present step, the terminal T has recovered $N \geq 2$ addresses {IP@1, IP@2, . . . , IP@N}, the terminal T selects one or more of these N concentrators for the M communication paths, in accordance with the present invention.

Initially, during a second step of the present embodiment, the terminal T obtains the value of at least one quality of service parameter QoS(i,j) for at least one path i, where i=1, . . . , M, and for concentrators $P_j$ that can be reached from the terminal T via this path i (and preferably for all of these concentrators).

In the present embodiment, and by way of example, the round trip time (RTT) delay is used as the quality of service parameter. Other parameters, e.g. the down path delay or the up path delay or indeed the available bandwidth could naturally be used to characterize the quality of a path between the terminal T and a network connection concentrator.

Furthermore, it is possible to use a combination of several quality of service parameters for selecting concentrators. Under such circumstances, the selection method of the invention may be enriched by instructions relating to the priorities to be given to quality of service parameters (in other words, the quality of service parameters are classified in a priority order); thus, selection will favor the concentrator that optimizes the quality of service parameter having the highest priority, and in the event of conflict, the following parameter in the order of priority will be used for deciding between concentrators.

Furthermore, in the present embodiment, the RTT is obtained using test messages that are referred to as "PROBE" messages. Such a PROBE message may for example be an Internet control message protocol (ICMP) message, and in particular an ICMP "ping" command (i.e. an ICMP "echo" request followed by an "echo reply" response), or a message for setting up a TCP session, or indeed exchanging a "TIMESTAMP" TCP option. Other mechanisms may naturally be implemented for measuring the value of the selected quality of service parameter.

The terminal T sends PROBE messages to each address {IP@1, IP@2, . . . , IP@N} of said list in order to calculate the RTT(i,j) associated with the path i. Preferably, the PROBE messages are sent via each of the M paths under consideration; in other words, each respective PROBE message is sent with a source address constituted by a respective address M selected from the M addresses allocated to the terminal T (in particular if distinct addresses are allocated thereto for each connection network). If the same address is used to connect to a plurality of access networks, the terminal must send as many PROBE messages as there are active access networks; the terminal must then force PROBE messages to be routed via each of the available interfaces.

Nevertheless, it should be observed that a concentrator might not be reachable via a given path; specifically, it can happen that the terminal T is incapable of sending the PROBE message to that concentrator over that path, or that it receives an ICMP error message as a response.

It is possible to visualize the results that are obtained from the following table.

|  | Concentrator $P_1$ | Concentrator $P_2$ | — | — | Concentrator $P_N$ |
|---|---|---|---|---|---|
| Path 1 | RTT (1, 1) | RTT (1, 2) | — | — | RTT (1, N) |
| Path 2 | RTT (2, 1) | RTT (2, 2) | — | — | RTT (2, N) |
| Path M | RTT (M, 1) | RTT (M, 2) | — | — | RTT (M, N) |

If the RTT measurements reveal significant distortion between the various paths, provision may be made for the terminal T to have the ability to decide not to use multiple paths for setting up a communication, or the ability to avoid including certain paths when setting up a multipath connection. For example, under such circumstances, the terminal T may switch from "multipath" mode to "simple connection"

mode for all of its communications so long as network conditions have not improved. The threshold indicating this major variation may be configured by the service provider, or may be coded in the computer program performing the method.

Finally, in a third step, at least one concentrator is selected from among the concentrators $P_j$ that have been reached from the terminal T, as described above.

To do this, it is initially determined for at least one path i, which concentrator $P_{k(i)}$ has the best quality of service value QoS(i,k(i)) (i.e. specifically for which the value of RTT is the smallest) in comparison with the quality of service values QoS(i,j), where j≠k(i), of the other concentrators $P_j$.

To perform this determination, it is possible to make provision for a tolerance value (which may for example be configured in the terminal T). Thus, two measurements RTT1 and RTT2 may be considered as being equivalent if, and only if:

$$|RTT1-RTT2|<\delta t$$

By way of example, the tolerance value δt may be set by a network connectivity provider, or it may be configured in the form of an environmental variable, or indeed it may be coded in the computer program performing the invention.

If the terminal T has a single interface, and thus only one path (in other words, M=1), the concentrator having the minimum RTT is selected from those concentrators that were reached over that path. This concentrator may then be used by the terminal T to set up multipath communications, e.g. by acting as an MPTCP relay at the service of the terminal T.

If the terminal T has a plurality of physical or logical interfaces, and thus a plurality of paths (in other words, M>1), several variants can be envisaged.

In a first variant, for at least one path i, the concentrator that is selected is the concentrator for which the RTT is the smallest in comparison with the RTT values of the other concentrators that have been reached from the terminal T via the path i.

Thus, in this first variant, a concentrator is selected for each path of the set of M paths independently of the other paths (which does not in any way prevent selecting the same concentrator for two different paths, should that be applicable).

This first variant is advantageous in terms of quality of service. In contrast, it raises the problem of the lack of a mechanism enabling the source address of the messages sent by the terminal T to be preserved, i.e. a mechanism enabling the terminal T to make use of two distinct concentrators without the messages that are relayed via those two concentrators being sent with different source IP addresses.

In a second variant, a single concentrator is selected for the set of M paths, which concentrator is the concentrator for which the RTT is the smallest, in comparison with the RTT values of the other concentrators that were reached from the terminal T, for the greatest number of paths among the M paths.

Thus, in this second variant, a single concentrator is selected for all of the M paths.

This second variant presents the advantage of preserving in simple manner the source address of the messages sent by the terminal T via any of the M paths. In contrast, it may be found to be sub-optimal from the quality of service point of view.

In order to implement this second variant, it is possible to operate as follows, with reference to the above table. In each row (associated with a given path), a "1" is written in the box corresponding to the concentrator associated with the minimum RTT, and a "0" is written in all the other boxes. Thereafter, each of the columns is summed, and the concentrator that is selected is the concentrator that presents the maximum sum value.

If two or more concentrators present the same maximum value for said sum, then one of those concentrators is selected by applying a secondary selection criterion. For example, it is possible to select the concentrator having the IP address that is the "greatest".

In this respect, it should be recalled that an IPv4 address (IPv4@1=a1.b1.c1.d1) is said to be greater than another IPv4 address (IPv4@2=a2.b2.c2.d3) if and only if "a1b1c1d1>a2b2c2d3". For example, the address "11.22.33.44" is said to be greater than the address "1.2.3.4". To compare an IPv4 address with an IPv6 address, it is possible by way of example to use the algorithm of RFC 6724 ("Default address selection for Internet protocol version 6 (IPv6)").

It is important to observe that the means of the communicating device of the invention are not necessarily contained within the communicating device. Thus, one embodiment of the invention may consist in activating one or more robots that send PROBE messages on behalf of the communicating device (or indeed a plurality of communicating devices). The frequency with which the tests are undertaken by the robot(s) may be configured by the network service operator. The advantage of using a robot is to avoid potential software updates that might be required in the communicating device(s).

Several instances of the robot may be activated in different access points of the network, in order to perform tests for one or more access networks. In so doing, the network operator may advantageously maintain a map giving the correspondence between the connection concentrator(s) to be configured by access zones. Such a map makes it possible to maintain visibility of the quality of connectivity for reaching the network concentrators managed by partners of the operator (e.g. in a context of fixed/mobile convergence, or of roaming). Such a map may also be used for installing traffic engineering policies.

These robots can thus be used during diagnostic operations, potentially for solving problems of connectivity indicated by users, or for acting proactively in the face of a degradation in the connectivity service.

In an embodiment of the invention, the results of the tests carried out by the communicating device are notified to an entity located in the network, referred to as the concentrator selection server (CSS) by means of a notification message that is referred to as "REPORT( )" message. The utility of this CSS entity is to be capable of making requests to the selected connection concentrator(s) in order to optimize the communications of the communicating device, but without that requiring the communicating device to be explicitly associated with the procedure for invoking (or indeed selecting) concentrators. This embodiment makes it possible in particular to involve a network concentrator in a connection in a manner that is transparent for the communicating device (and thus for the person using it).

The function of the CSS entity is to instruct the underlying network to redirect the traffic issued by a communicating device or sent to a communicating device to the concentrator(s) optimizing quality of service for the communicating device. By way of example, the instruction from the CSS entity to the underlying network may consist in injecting specific routes by using the resources of a dynamic routing protocol. Another deployment example is installing a dispatcher that intercepts traffic coming from or going to all of the communicating devices; the CSS entity can then give the dispatcher instructions that are specific to each communicating device in order to redirect traffic coming from or going to each communicating device to the selected concentrators.

Figure 4:
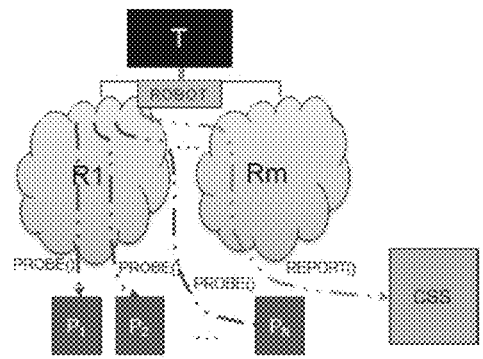
FIG. 4 shows an embodiment of the invention in which a robot performs quality of service tests and notifies the results of those tests to a dedicated server.

FIG. 4 shows an implementation of the invention combining the use of a robot and of a CSS entity.

Figure 5A:
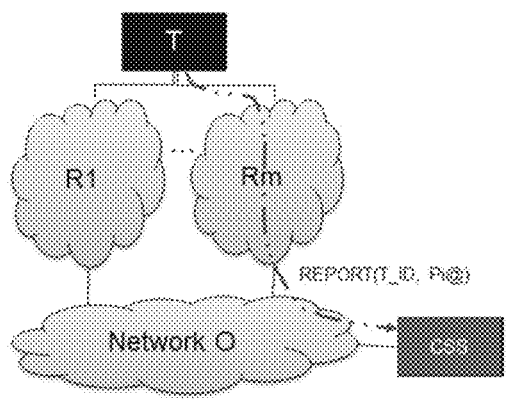
FIGS. 5a and 5b show an embodiment of the invention in which a terminal notifies the results of quality of service tests to a dedicated server.
Figure 5B:
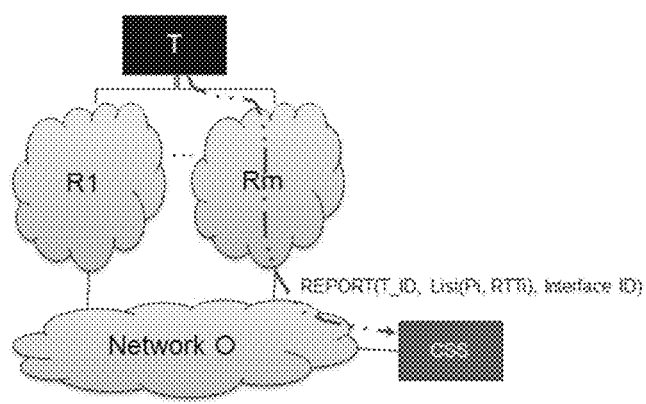

FIGS. 5a and 5b show, by way of example, two variants of a terminal T notifying the CSS entity of the results of quality of service tests in accordance with the invention.

In a first variant, shown in FIG. 5a, the REPORT( ) notification message contains at least the address of the selected connection concentrator (Pi@), and the identifier T_ID of the terminal T (e.g. its IP address, its MAC address, or its network line identifier). The CSS entity in this example takes charge of redirecting the traffic of the terminal T to the selected concentrator(s).

In a second variant, shown in FIG. 5b, the REPORT( ) notification message contains at least all of the measurements taken by the terminal T together with the identifier T_ID of the terminal T. In this second variant, the CSS entity is responsible for selecting the concentrator(s) and for instructing the underlying network so that traffic coming from or going to the terminal T is intercepted by the selected concentrator(s). This variant enables an operator to control the service provided to the operator's clients, thereby limiting any degradation of service that might be caused, e.g. by an ill-intentioned implementation. This variant also enables the operator to optimize the use of the concentrators it has deployed, and possibly to adjust the locations of those concentrators in the network in order to optimize the use of resources. For example, an operator may decide to activate a new network concentrator instance at a point of presence if the measurements returned to the concentrators that are already active reveal significant distortion among the measurements.

The method of the invention may be implemented at regular intervals for example, and/or at each change of network connection condition (e.g. when a new network is attached or when there is a loss of an attachment to a network, when an address allocated to an interface expires, or indeed when a new concentrator is discovered). Nevertheless, the method is not necessarily reiterated on each new connection. The interval between reiteration of tests may be configured by a user, or it may be provided by the network service operator (e.g. via DHCP), or indeed it may be coded in the computer program implementing the invention (value by default).

When a new concentrator has been selected by a communicating device, that device may decide to migrate its active connections immediately to the new concentrator, or to maintain the use of some or all of the concentrators on which those active connections rely. Provision may also be made for the communicating device to be capable of deciding not to use a path presenting mediocre quality in order to reach a selected concentrator.

In its communications, the communicating device may aim for a selected concentrator by using a packet encapsulation mechanism or any other form of mechanism for conveying traffic to the address of a third party. By way of example, there follows a description of a communication mechanism that advantageously makes it possible to avoid encapsulating packets; specifically, encapsulation tends to penalize the quality of transmission, e.g. because of its impact on the maximum size of the packets that are transmitted, and the risk of giving rise to problems of re-ordering.

Figures 6, 7:
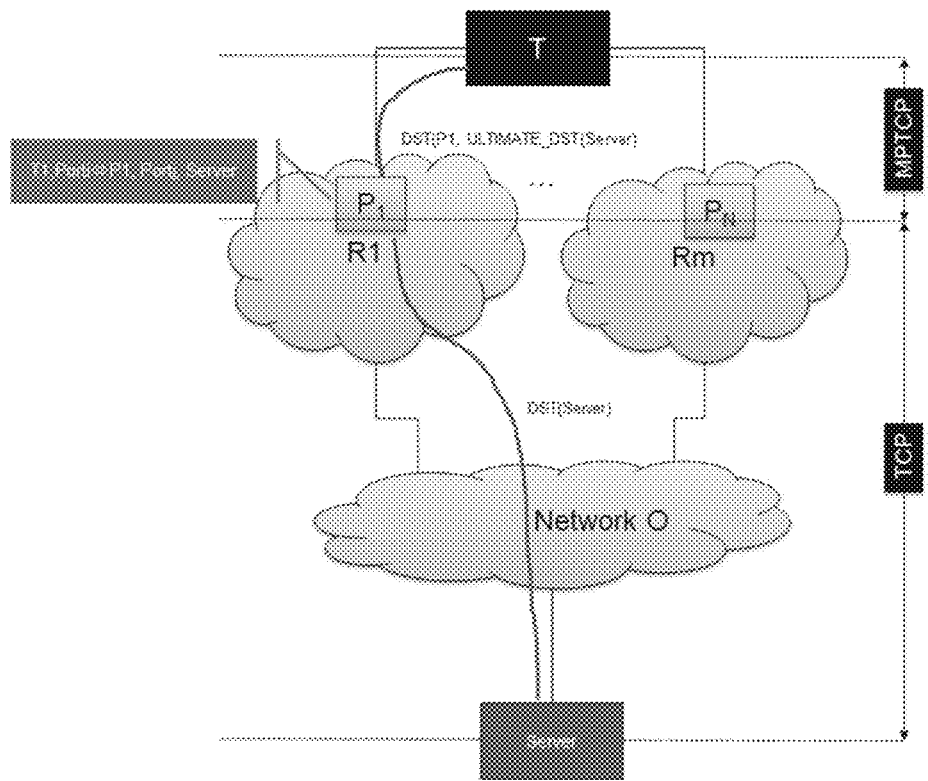
FIG. 6 shows a TCP option indicating the address of a remote server.
FIG. 7 shows an example of a communication mechanism between a terminal and a remote server, in which the TCP option shown in FIG. 6 is used.

In this example, a TCP option is used specifying the address of the remote server: this TCP option is referred to as ULTIMATE_DST, and it is shown in FIG. 6. The concentrator uses the IP address and the port number specified in this option to transmit data packets to the remote server.

An example of this ULTIMATE_DST option in use is shown in FIG. 7. This figure shows a terminal T having multiple paths. The terminal T applies the connection concentrator selection method of the invention. Let the selected concentrator be $P_1$. When the terminal T seeks to set up a connection with a remote server, it inserts the address of that server in an ULTIMATE_DST option. After receiving this message, $P_1$ instantiates an entry for storing the association between the address of the terminal T and the address of the server; thereafter, $P_1$ replaces the destination address by the address of the server.

The invention can be implemented within communications network nodes, e.g. subscriber terminals, routers, gateways, or concentrator selection servers, by means of software and/or hardware components.

The software components may be incorporated in a conventional computer program for managing a network node. That is why, as mentioned above, the present invention also provides a computer system. The computer system comprises in conventional manner a central processor unit using signals to control a memory, together with an input unit and an output unit. Furthermore, the computer system may be used to execute a computer program including instructions for implementing any of the selection methods of the invention.

Specifically, the invention also provides a computer program as described briefly above. The computer program may be stored on a computer readable medium and may be suitable for execution by a microprocessor. The program may use any programming language, and may be in the form of source code, object code, or code intermediate between source code and object code, such as in a partially compiled form, or in any other desirable form.

The invention also provides a non-removable or partially or completely removable data medium including instructions of a computer program as described briefly above.

The data medium may be any entity or device capable of storing the program. For example, the data medium may comprise storage means such as a read only memory (ROM), e.g. a compact disk (CD) ROM or a microelectronic circuit ROM, or magnetic recording means such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from a network such as the Internet.

In a variant, the data medium may be an integrated circuit in which the program is incorporated, the circuit being adapted to execute or to be used in the execution of any of the selection methods of the invention.

Although the present disclosure has been described with reference to one or more examples, workers skilled in the art will recognize that changes may be made in form and detail without departing from the scope of the disclosure and/or the appended claims.

The invention claimed is:

1. A selection method comprising:
selecting network connection concentrators for a given set of M≥1 communication paths usable by a communicating device, M being an integer variable, and each respective interface of said communicating device being connected to a respective path, wherein selecting comprises the following steps implemented by the communicating device:
a) identifying a set of concentrators (P1, P2, ..., $P_N$) situated in at least one network to which the communicating device is connected, each concentrator making it possible to aggregate connections using a plurality of paths suitable for being used by the communicating device, wherein N is an integer variable and N≥2;
b) obtaining the value of at least one quality of service parameter QoS(i,j) for at least one path i, where i=1, ..., M, and for concentrators $P_j$ of the set of concentrators P1, P2, ..., $P_N$ that are reachable from the communicating device via said path i, wherein i is an index to the set of concentrators P1, P2, ..., $P_N$; and
c) selecting at least one concentrator from said set on the basis of said quality of service values that are obtained.

2. The selection method according to claim 1, wherein during said step c), the selected concentrator $P_{k(i)}$ is the concentrator for which the quality of service value QoS(i,k(i)) is optimal in comparison with the quality of service values QoS(i,j), where j≠k, of the other concentrators that have been reached from the communicating device via the path i.

3. The selection method according to claim 1, wherein during step c), a single concentrator $P_k$ is selected for all of said M paths, this concentrator $P_k$ being the concentrator for which the quality of service value QoS(i,k) is optimal in comparison with the quality of service value QoS(i,j), where j≠k, of the other concentrators that have been reached from the communicating device, and for the largest number of paths among the M paths.

4. The selection method according to claim 1, wherein during said step b), said quality of service values are obtained by using test messages passing via said paths.

5. The selection method according to claim 1, wherein said multipath connection implements the multipath TCP (MPTCP) protocol.

6. A communicating device comprising:
a processor; and
a non-transitory computer-readable medium comprising instructions stored thereon, which when executed by the processor configure the processor to perform acts comprising:
identifying a set of concentrators (P1, P2, ..., $P_N$) situated in at least one network to which the communicating device is connected, each concentrator making it possible to aggregate connections using a plurality of paths suitable for being used by the communicating device, wherein N is an integer variable and N≥2;
obtaining the value of at least one quality of service parameter QoS(i,j), for at least one path i, where i=1, ..., M from a given set of M≥1 communication paths usable by said communicating device, M being an integer variable, and for concentrators $P_j$ of the set of concentrators P1, P2, ..., $P_N$ that are reachable from the communicating device via said path i, wherein j is an index to the set of concentrators P1, P2, ..., $P_N$, each respective interface of the communicating device being connected to a respective path; and
selecting at least one concentrator from said set on the basis of said quality of service values that are obtained.

7. The communicating device according to claim 6, wherein the device comprises a client device.

8. The communicating device according to claim 6, wherein the device comprises a proxy device suitable for implementing a multipath connection and connected to a client device.

9. A system for selecting network connection concentrators, the system comprising:
a communicating device comprising:
a processor; and
a non-transitory computer-readable medium comprising instructions stored thereon, which when executed by the processor configure the communicating device to perform acts comprising:
identifying a set of concentrators (P1, P2, ..., $P_N$) situated in at least one network to which the communicating device is connected, each concentrator making it possible to aggregate connections using a plurality of paths suitable for being used by the communicating device, wherein N is an integer variable and N≥2; and
obtaining the value of at least one quality of service parameter QoS(i,j), for at least one path i, where i=1, ..., M from a given set of M≥1 communication paths usable by said communicating device, M being an integer variable, and for concentrators $P_j$ of the set of concentrators P1, P2, ..., $P_N$ that are reachable from the communicating device via said path i, wherein i is an index to the set of concentrators P1, P2, ..., $P_N$, each respective interface of the communicating device being connected to a respective path; and
a server for selecting network connection concentrators, which is configured to:
select at least one concentrator from said set on the basis of said quality of service values that are obtained; and
for at least the path i, assist in redirecting the traffic issued by or sent to the communicating device towards said selected concentrator.

10. A non-transitory computer-readable medium comprising a computer program stored thereon including computer program code instructions for executing steps of a selection method when the instructions are execute by a processor of a communicating device, wherein the method comprises:
selecting network connection concentrators for a given set of M≥1 communication paths usable by the communicating device, M being an integer variable, and each respective interface of said communicating device being connected to a respective path, wherein selecting comprises:
a) identifying a set of concentrators (P1, P2, ..., $P_N$) situated in at least one network to which the communicating device is connected, each concentrator making it possible to aggregate connections using a plurality of paths suitable for being used by the communicating device, wherein N is an integer variable and N≥2;
b) obtaining the value of at least one quality of service parameter QoS(i,j) for at least one path i, where i=1, ..., M, and for concentrators $P_j$ of the set of concentrators P1, P2, ..., $P_N$ that are reachable from the communicating device via said path i, wherein j is an index to the set of concentrators P1, P2, ..., $P_N$; and c) selecting at least one concentrator from said set on the basis of said quality of service values that are obtained.

\* \* \* \* \*